(12) United States Patent
Ohwa

(10) Patent No.: US 7,031,016 B1
(45) Date of Patent: Apr. 18, 2006

(54) SYSTEM FOR CONTROLLING IMAGES ACCORDING TO APPLICATIONS

(75) Inventor: Yasushi Ohwa, Tokyo (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/579,456

(22) Filed: May 26, 2000

(51) Int. Cl.
    *H04N 1/387* (2006.01)

(52) U.S. Cl. .................. 358/1.2; 358/1.9; 358/530; 358/453

(58) Field of Classification Search ............. 358/1.2, 358/1.9, 450, 453, 462, 530
See application file for complete search history.

(56) References Cited

U.S. PATENT DOCUMENTS

| | | | | | |
|---|---|---|---|---|---|
| 5,696,888 | A | * | 12/1997 | Ikeda | 358/1.2 |
| 6,005,679 | A | * | 12/1999 | Haneda | 358/453 |
| 6,434,276 | B1 | * | 8/2002 | Hirosawa et al. | 382/284 |
| 6,492,994 | B1 | * | 12/2002 | Yokouchi | 358/450 |
| 6,587,583 | B1 | * | 7/2003 | Kurzweil et al. | 382/164 |

\* cited by examiner

*Primary Examiner*—Thomas D. Lee
(74) *Attorney, Agent, or Firm*—Foley & Lardner LLP

(57) ABSTRACT

A system for controlling images according to applications carries out print recording of high resolution image delivered from an image supply source and delivers such image to a display unit of external equipment. The system for controlling images comprises an image input unit, a high resolution image storage unit for storing high resolution image inputted through an image input unit, a display image generating unit for converting high resolution image into low resolution image and for adding or attaching preservation location data in the storage unit of the high resolution image to a portion of the display range of this low resolution image to generate image, an output request unit for making a print output request for display image, a preservation location data reading unit for reading the preservation location data from the display image, a transfer request/receiving unit for outputting image transfer request to the high resolution image storage unit on the basis of the preservation location data which has been read by the preservation location data reading unit and for receiving the high resolution image transferred on the basis of this image transfer request, and an image output unit for outputting the received high resolution image.

20 Claims, 15 Drawing Sheets

AT TIME OF IMAGE INPUT

No. Command Parameter

105 Select (200, 400) - (500, 700)

106 Cut

107 Move (200, 400) , (900, 100)

108 Paste

RESOLUTION MATCHING
PROCESSING
(300dpi → 600dpi)

No. Command Parameter

105 Select (400, 800) - (1000, 1400)

106 Cut

107 Move (400, 800) - (1800, 200)

108 Paste

SYSTEM FOR CONTROLLING IMAGES ACCORDING TO APPLICATIONS

BACKGROUND OF THE INVENTION

This invention relates to a system for controlling images according to applications, and more particularly to a system for controlling images according to applications used in image recording systems provided with an image supply apparatus such as client personal computer, etc. and/or an image forming apparatus such as printer, etc. to prepare high picture quality image and low picture quality image with respect to fine images to output high picture quality image at the time of image recording and to carry out various processing by low picture quality image when otherwise.

In recent years, with rapid progress of the field of electronic information technology and/or information communication technology, quantity of information handled in the computer system is increased and there have been increased fine images as image to be displayed on the display or printed by the printer. As images processed by the computer and printed by the printer, text data such as document data had already occupied the great part thereof. At present, however, there are also included video data such as graphs classified by color and/or video data of photographic picture quality. It has been required to process vast quantity of data for the purpose of processing such high fine images.

Hitherto, all the same picture data are used as not only data for printing but also display data used at the terminal. Therefore, there was no possibility that high picture quality images are specially prepared for printing.

Further, in the case where user intends to handle image of high picture quality at the time of printing, load at the terminal was conventionally extremely great because image data sizes are large. In addition, when user intends to lessen load to allow picture data size to be only smaller one, it was impossible to handle image of high picture quality, resulting in the problem that printed matters of high quality were not obtained.

SUMMARY OF THE INVENTION

An object of this invention is to provide a system for controlling images according to applications in which management (control) of high resolution image for printing is carried out by input/output equipment and display terminal handles low resolution picture to which storage location information of high resolution picture is added, thereby making it possible to lessen load to be handled of image on display terminal, etc., and at the time of printing, replacement into image of high resolution is carried out by input/output equipments so that high quality printing result can be obtained.

The most fundamental concept of this invention is that preservation location of high resolution image is buried into low resolution image, and at the time of printing, this is recognized on the input/output equipment in which high resolution image is preserved to replace it by high resolution image to thereby print such image.

To achieve the above-mentioned object, a system for controlling images according to applications in accordance with this invention is directed to a system for printing and recording high resolution image delivered from an image supply source and for supplying image to a display unit of an external equipment, the system comprising: an image input unit for inputting high resolution image delivered from the image supply source; a high resolution image storage unit for storing the high resolution image inputted through the image input unit; display image generating means for converting the high resolution image into low resolution image and for adding preservation location data in the storage means of the high resolution image to a portion of display range of this low resolution image to generate display image; output request means provided at the external equipment and for making a request in order to carry out print output of display image displayed on the display unit, a preservation location data reading unit for reading the preservation location data from the display image inputted from the output request means; a transfer request/receiving unit for outputting image transfer request to the high resolution image storage unit on the basis of the preservation location data which has been read by the preservation location data reading unit and for receiving the high resolution image transferred on the basis of this request; and an image output unit for outputting the high resolution image received by the transfer request/receiving unit.

DESCRIPTION OF THE EMBODIMENTS

Figure 1:
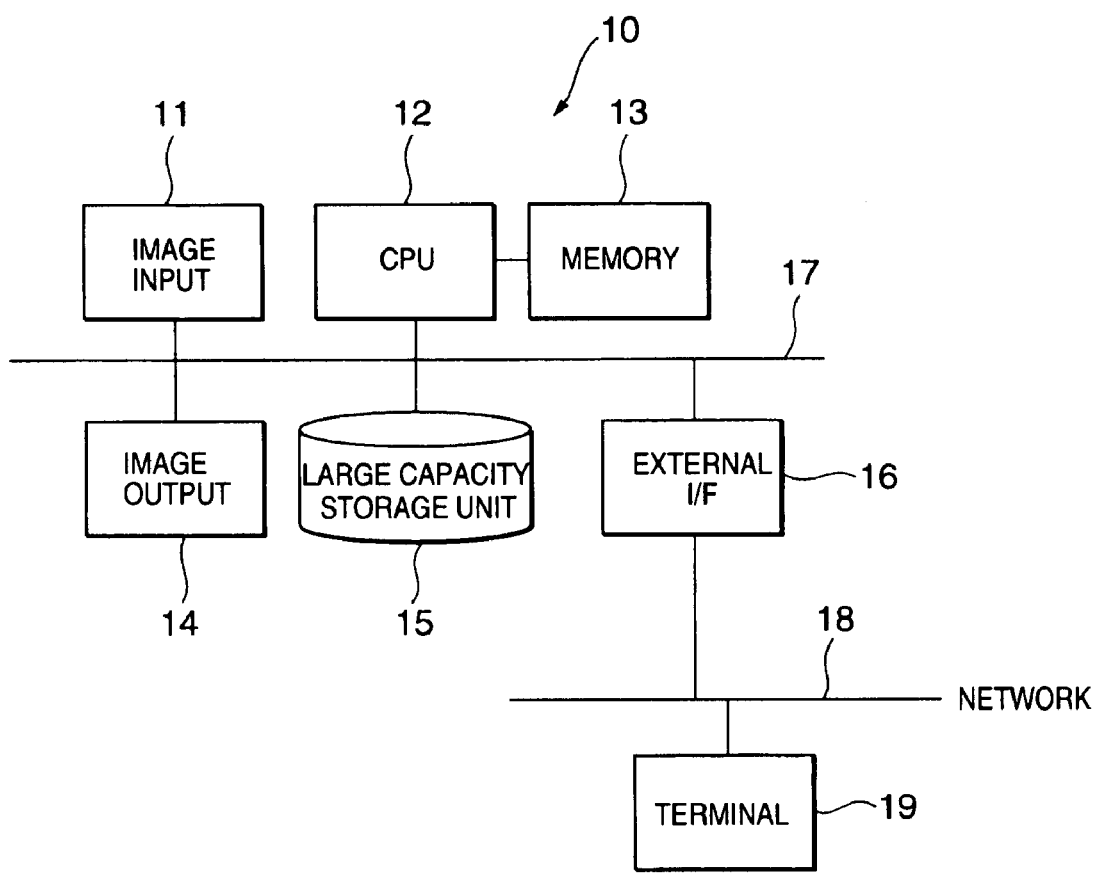
FIG. 1 is a block diagram showing the configuration of a system for controlling images according to applications in accordance with an embodiment of this invention.
Figure 2:
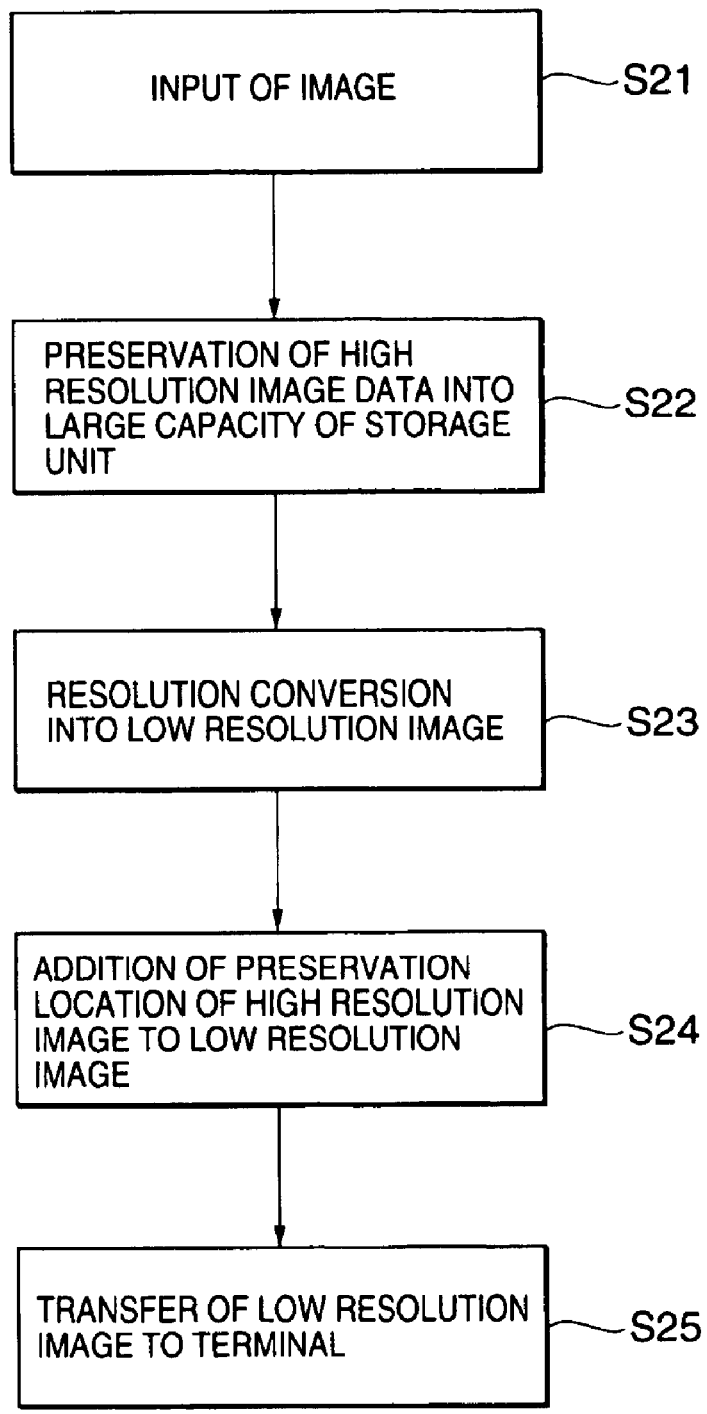
FIG. 2 is a flowchart showing flow of basic processing at the time of image input of the system for controlling images according to applications; shown in FIG. 1.
Figure 3:
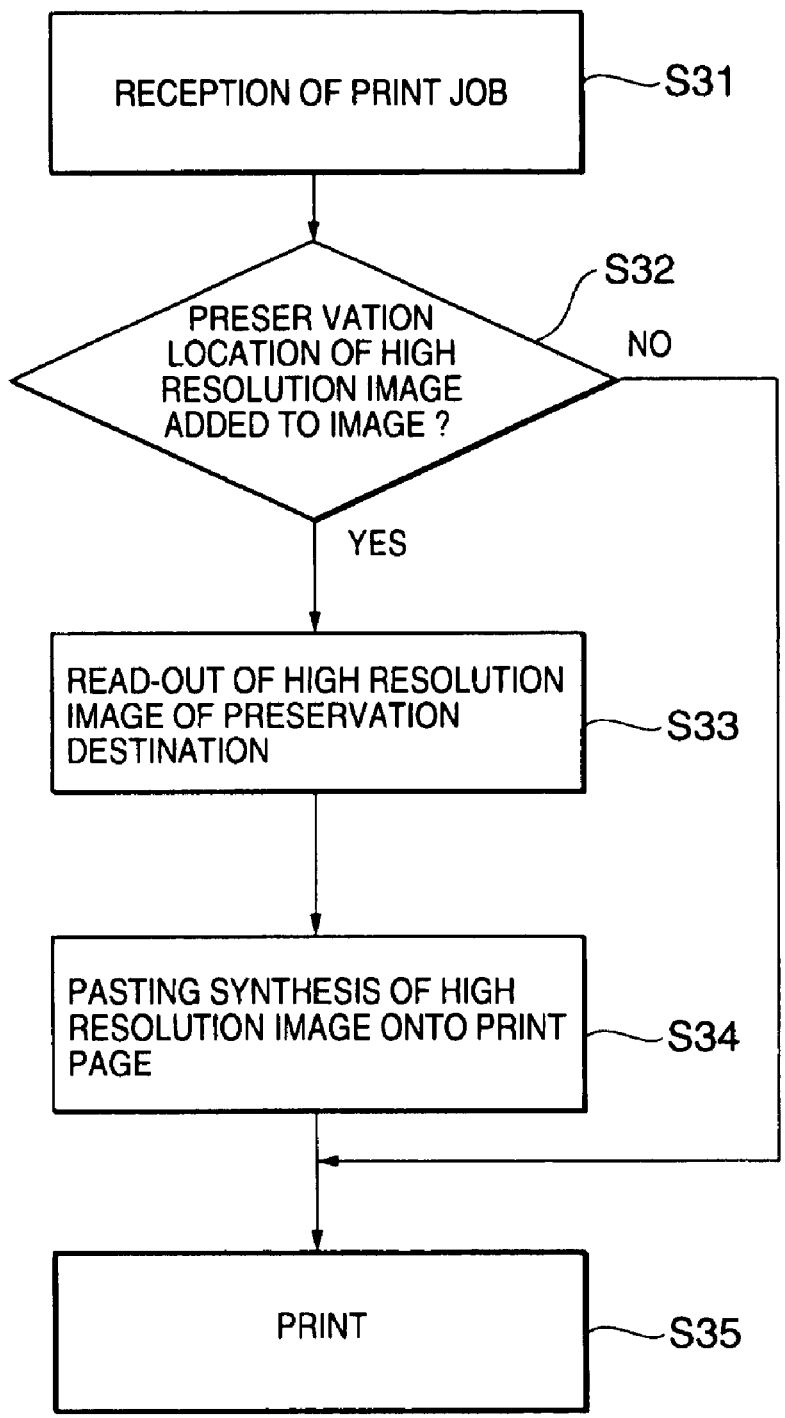
FIG. 3 is a flowchart showing flow of basic processing at the time of print image output of the system for controlling images according to applications shown in FIG. 1.

Preferred embodiments of a system for controlling images according to applications in accordance with this invention will now be described in detail with reference to the attached drawings. FIG. 1 shows a configuration of the system for controlling images according to applications in accordance with the embodiment of this invention. FIGS. 2 and 3 show basic processing flows thereof.

As shown in FIG. 1, the system for controlling images according to applications 10 is of configuration in which an image input unit 11, a CPU 12, a memory 13, an image output unit 14, a large capacity storage unit 15, an external interface (hereinafter simply referred to as I/F) 16 are respectively connected by a common bus 17. The CPU 12 carries out various control processing, control (management) processing and image processing, etc. in accordance with program in the memory 13. In the memory 13, program codes and data are stored. The image input unit 11 is means for reading manuscript to allow it to undergo conversion processing into image data.

The image output unit 14 is means for carrying out print output of image data onto recording paper. The large capacity storage unit 15 can hold and store, as occasion demands, large capacity data such as image data which has been read from the image input unit 11 and control data thereof, etc. The external I/F 16 provides means for communicating with an external equipment, e.g., a user terminal 19 through a network 18. In addition, the image input unit 11, the image output unit 14, the large capacity storage unit 15 and the external I/F 16 are controlled by the CPU 12.

The operation of the system for controlling images according to applications in accordance with the embodiment of this invention will now be described with reference to the flowcharts of FIGS. 2 and 3. Step S21 to step S25 of FIG. 2 indicate basic processing flow at the time of image input. Image data is inputted from the image input unit 11 (step S21) to store and preserve such image data (high resolution image data) into the large capacity storage unit 15 (step S22). Then, image data is caused to undergo resolution conversion into low resolution image by the CPU12 (step S23). Further, preservation location, e.g., directory path and/or file name, etc. of high resolution image is added to low resolution image data, or such preservation location is buried into image data (step S24). The low resolution image is transferred to the terminal 19 through the external I/F 16.

FIG. 3 shows basic processing flow at the time of image print output. First, print job is received from the terminal 19, etc. through the external I/F 16 (step S31). There is carried out examination as to whether or not image data exists in page of print job and preservation (storage) location of high resolution image is added (attached) or buried (step S32). In the case where the preservation location of high resolution image is not found, no processing is carried out to carry out print operation as it is. In the case where preservation location of high resolution image is found, high resolution image is read out from the large capacity storage unit 15 in accordance with such preservation location (step S33) to carry out replacement synthesis of image data into high resolution image which has been read out (step S34). Page having image data in which preservation location of high resolution image is added or buried is printed after undergone these series of processing (step S35).

Figure 4:
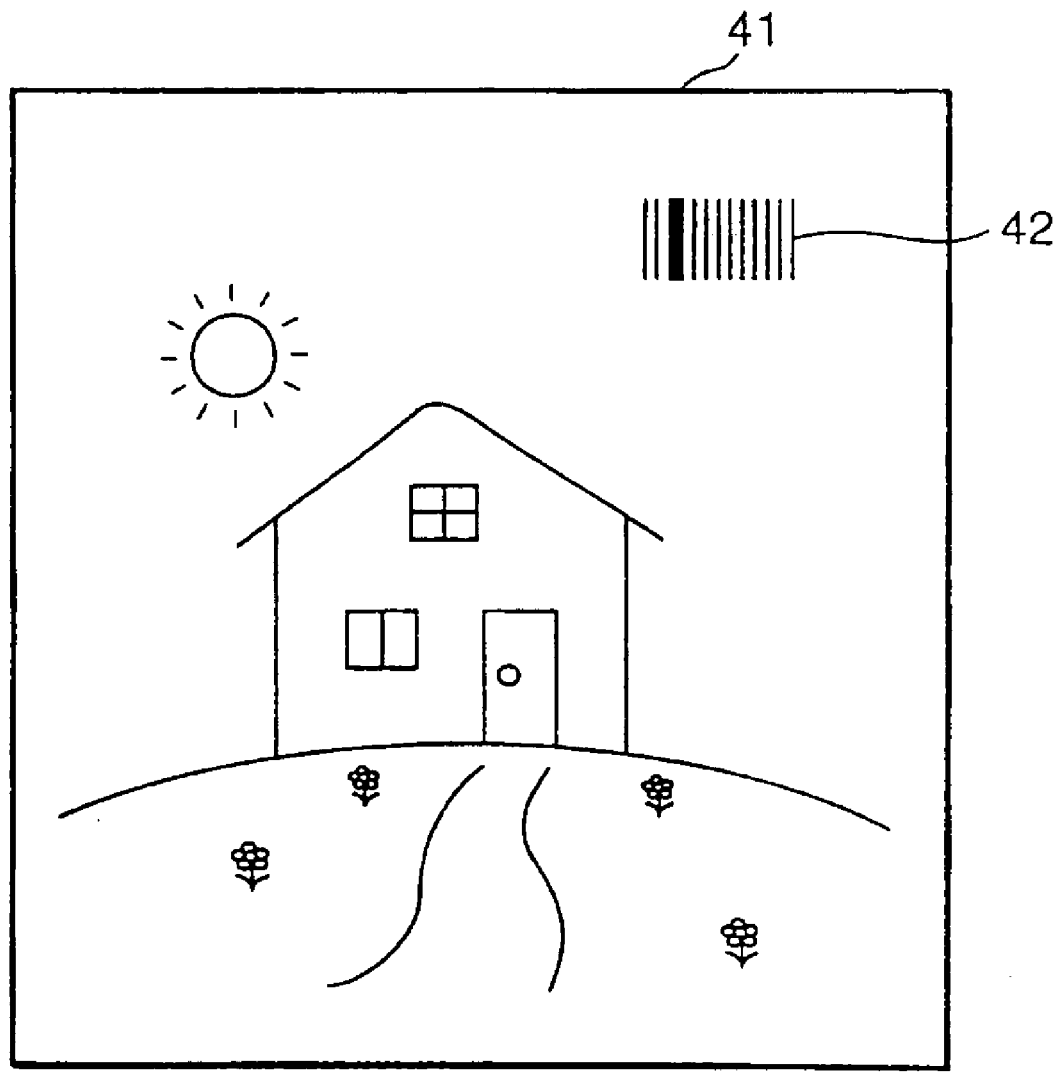
FIG. 4 is an explanatory view showing image data as low resolution image.

There are some adding (attaching) or burying methods of preservation location at the step S24 in FIG. 2. First, there is a method of burying or embedding preservation location data into image data itself. Namely, as shown in FIG. 4, preservation location data is buried into image data 41 as bar code data 42. Moreover, in the case where there is the possibility that feeling of disagreement is given resulting from the fact that bar code exists within display picture on screen, there is a method in which processing is carried out such that user does not notice when viewed by technique such as electronic see through, etc. to embed such preservation location data into image data. In addition, preservation location data may be added as header information of image data.

Figure 5:
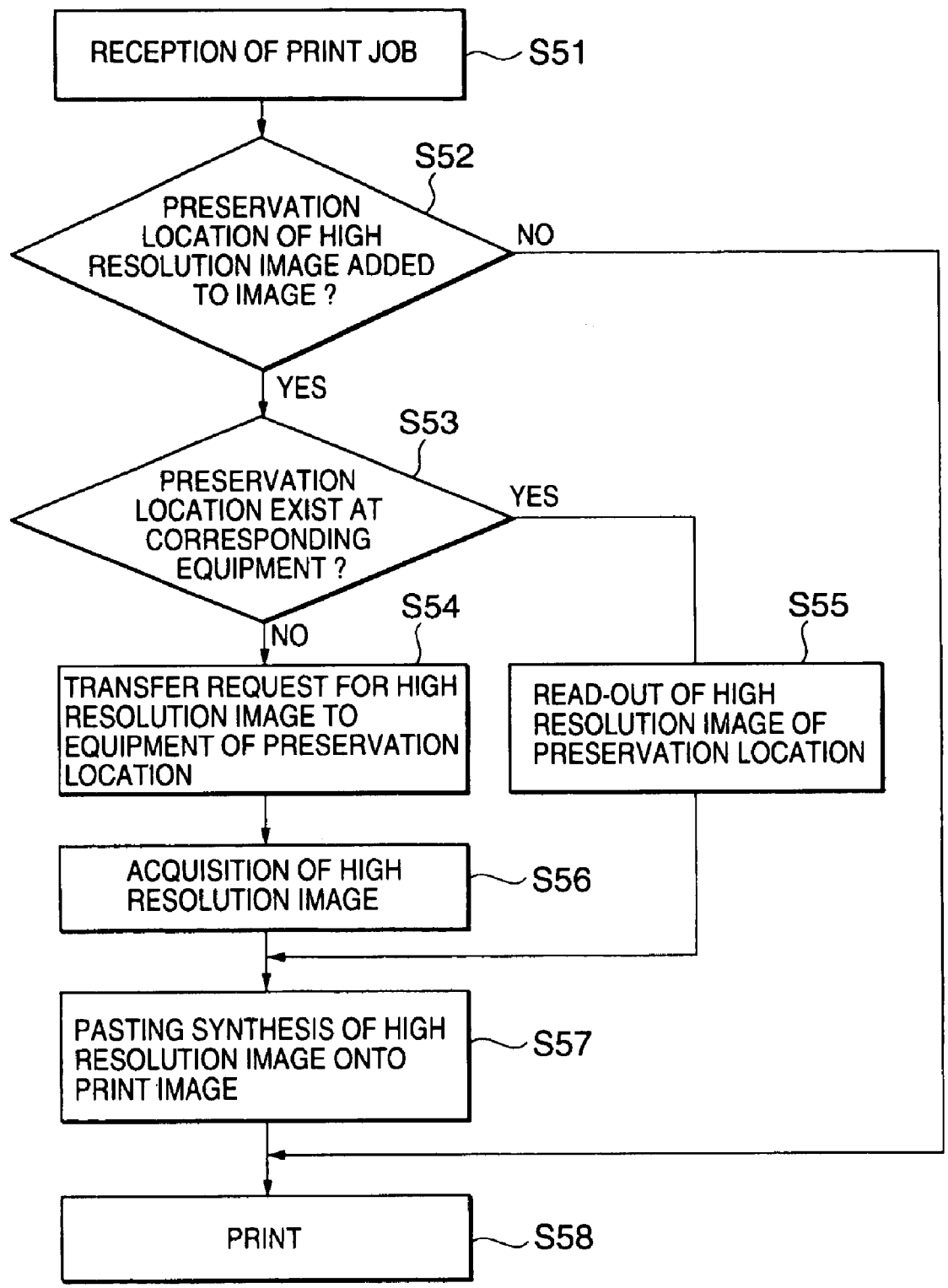
FIG. 5 is a flowchart showing flow of processing when high resolution image is preserved in other network in the system for controlling images according to applications of FIG. 1.

Explanation will now be given in connection with the case where high resolution image is preserved in another network equipment when print job is received from terminal 19. FIG. 5 is processing flow at the time of print output in such a case. The output equipment which has received print job through the external I/F 16 from the terminal 19 (step S51) examines as to whether or not preservation location of high resolution image is added (attached) to image data of print page (step S52). In the case where such preservation location is not added, printing is carried out as it is from the image output unit 14 (step S58). In the case where such preservation location is added, high resolution image is read out from the storage unit 15 when preservation location exists at this (corresponding) output equipment (step S55) to carry out pasting synthesis with respect to print page (step S57) to print it by the image output unit 14 (step S58). On the other hand, in the case where preservation location exists at another equipment through network, this preservation location equipment is requested to carry out transfer of high resolution image data through the external I/F 16 (step S54) to acquire (receive and obtain) it (step S56). The high resolution image data thus obtained is caused to undergo pasting synthesis onto the print page (step S57) to carry out print by the image output unit 14 (step58).

Figure 6:
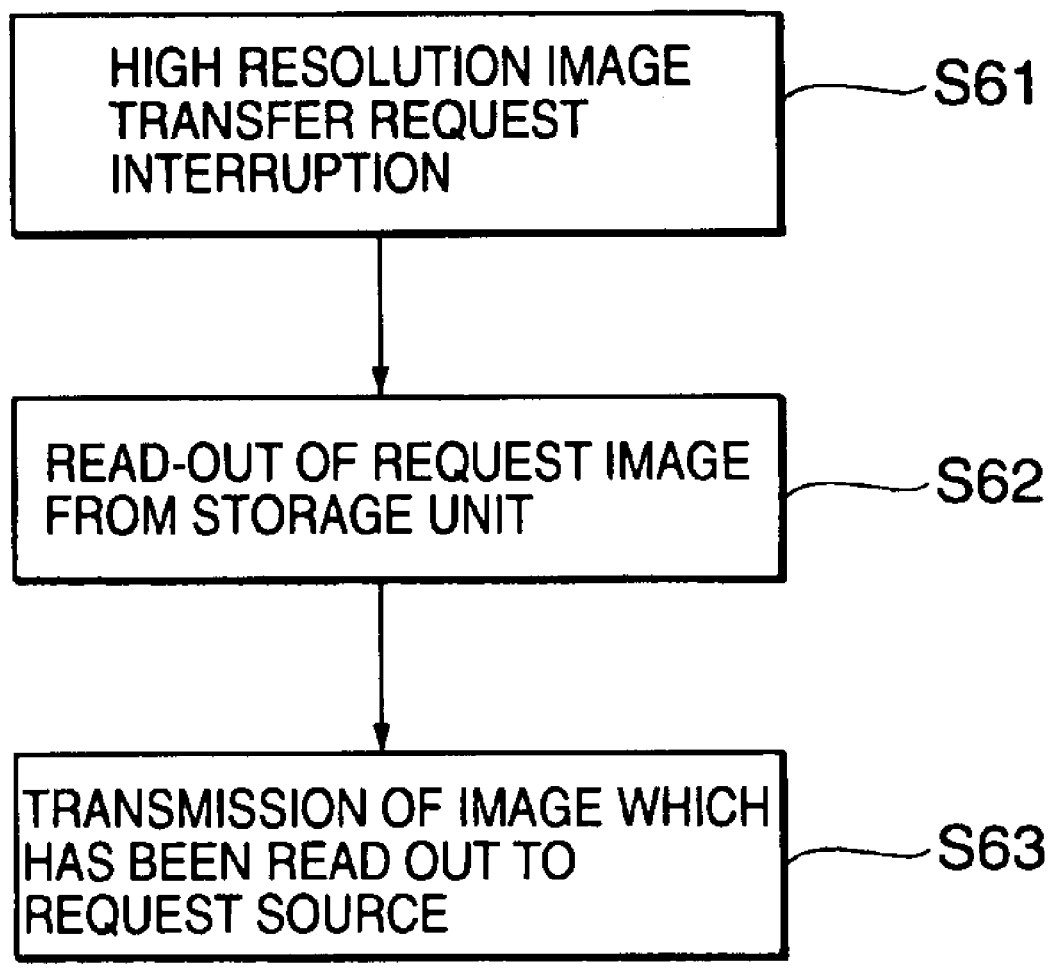
FIG. 6 is a flowchart showing flow of processing when high resolution image is provided in the system for controlling images according to applications of FIG. 1.

FIG. 6 shows processing flow when equipment which has preserved and stored high resolution image receives transfer request for high resolution image to provide image. First, transfer request for high resolution picture is started (activated) by interruption (step S61) to read out high resolution image from the storage unit in accordance with request (step S62). The high resolution image thus read out is transmitted to request source through network (step S63).

Figure 7:
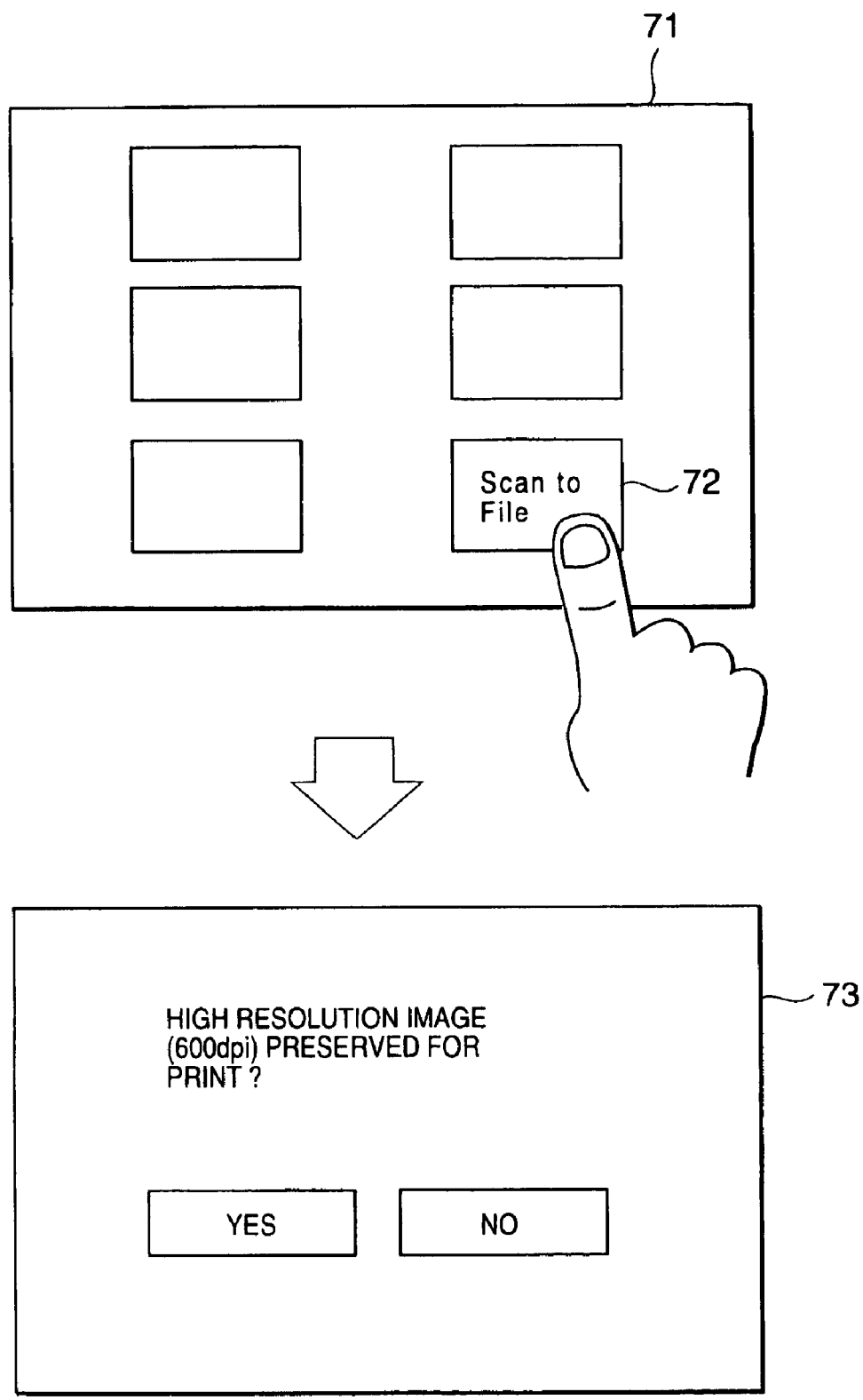
FIG. 7 is an explanatory view showing control touch panel of input/output equipment and inquiry display thereof.

Means for allowing user to select whether or not high resolution image is preserved and controlled in inputting manuscript will now be described. Reference numeral 71 of FIG. 7 indicates control touch panel of input/output equipment. When a manuscript input button 72 displayed is pushed down, display to inquire user as to whether or not high resolution image is preserved and controlled for print as indicated by picture 73 to allow user to select it. In the case where user preserves and controls the high resolution image for print, this high resolution image is preserved and image converted into low resolution image designated by user in advance is transferred to the terminal in the state where preservation location of high resolution image is added. In the case where user selects that high resolution image is not preserved and controlled, only image resolution-converted into low resolution designated by user in advance is transferred to the terminal.

Moreover, it is also conceivable to preserve and control in combination image caused to undergo mono-chromatic conversion of high resolution image to be preserved and controlled. In this case, at the time of image print of FIG. 3, there is judged whether or not it is suitable that print page is mono-chromatic before read-out of high resolution image of step S33. In the case where it is suitable that print page is mono-chromatic, mono-chromatic high resolution image is read out. In the case where it is desired that print page is color, colored high resolution image is read out (step S33). Thus, in the output equipment in which it takes much time in color printing as compared to monochromatic printing, such as, for example, four rotation process machine, etc., the output performance is improved and color toner consumption can be suppressed.

Figure 8:
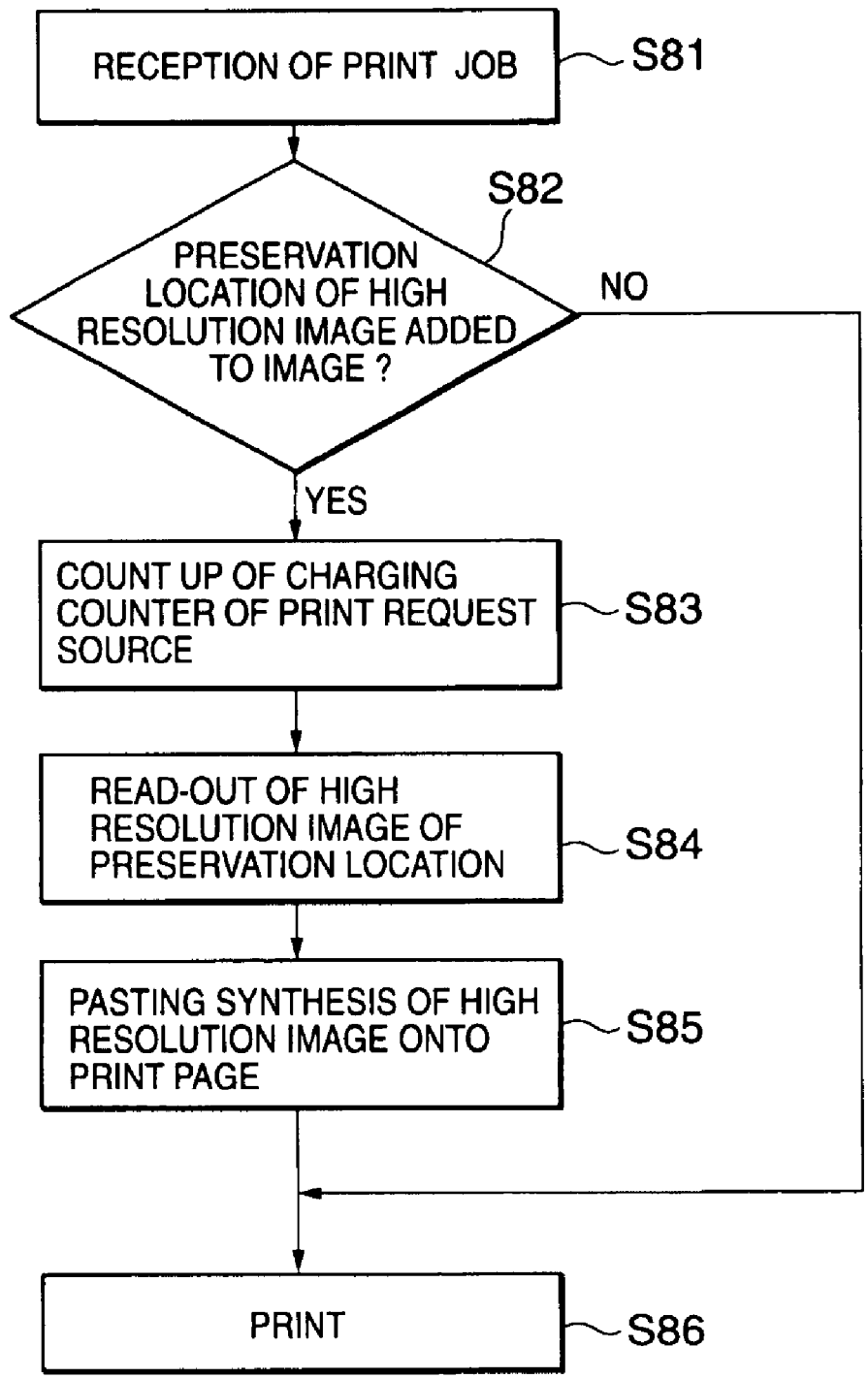
FIG. 8 is a flowchart showing flow of processing when utilization fee is charged in the case where high resolution image is provided for pay.

Let now consider that utilization fee is charged every time preserved and controlled high resolution image is outputted as print. The processing flow at this time is shown in FIG. 8. Print job is received from terminal 19 (step S81) to judge as to whether or not preservation location of high resolution image is added (attached) to image data (step S82). In the case where such preservation location is added (attached), because high resolution image is utilized, charging with respect thereto is carried out to count up the charging counter by one (step S83). At the subsequent steps, similar processing are carried out (steps S84 to S86).

In addition, in place of carrying out processing as to whether or not image data is included every page in the print job from the terminal 19 with respect to the facts which have been explained, let consider that such processing is carried out with respect to image data region within page. Such an approach is employed to extract image featured region of page at the time of manuscript input to determine such image region therefrom to carry out similar processing with respect to the entirety of such regions. Further, also with respect to the time of print output, preservation locations of high resolution images are examined every image regions within the page. Thus, replacement synthesis is carried out as occasion demand to carry out print output thereof.

Figure 9:
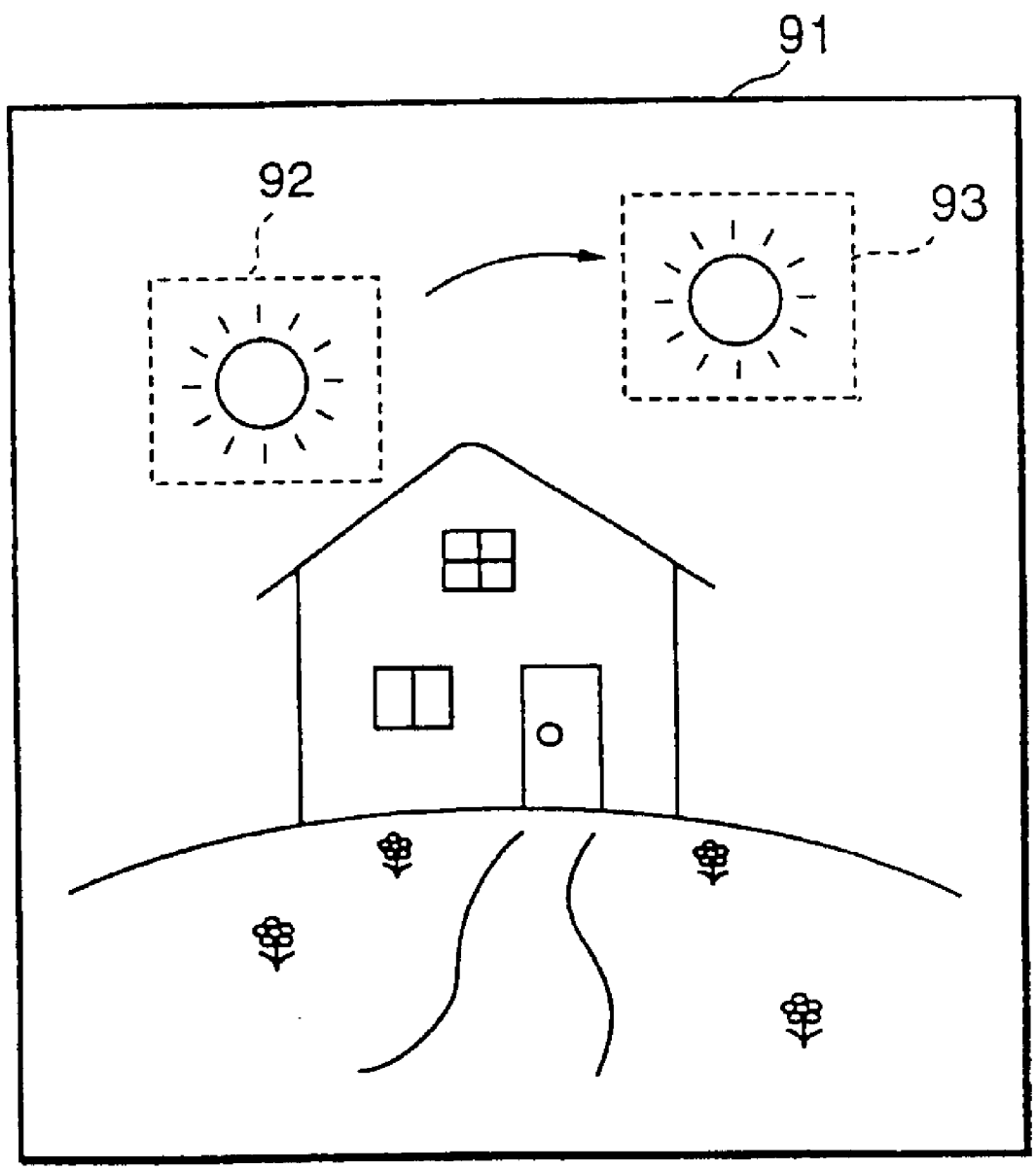
FIG. 9 is an explanatory view when low resolution image is edited.
Figure 10:
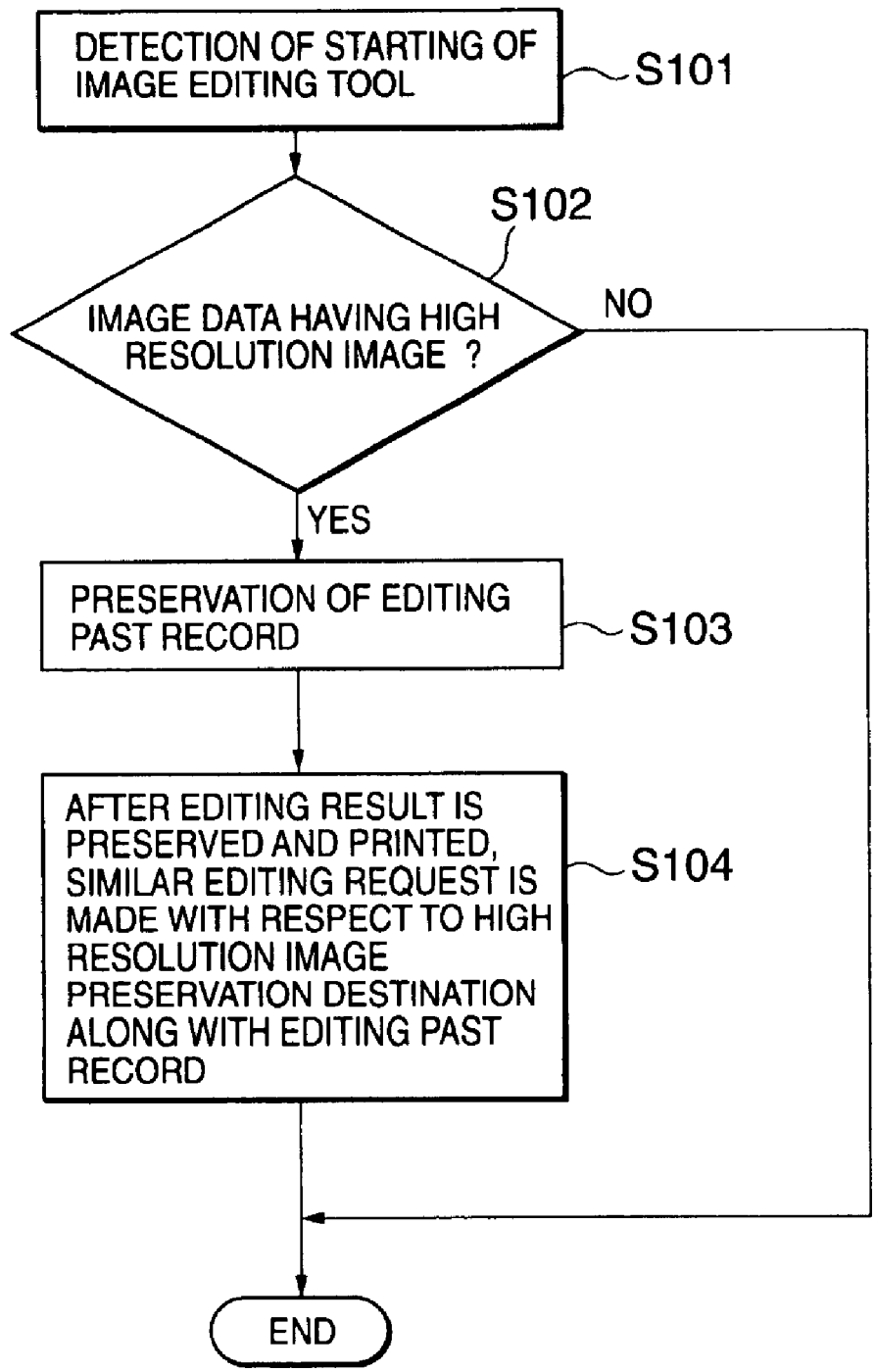
FIG. 10 is a flowchart showing processing at the time of image editing shown in FIG. 9.
Figures 11, 12:
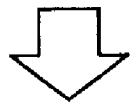
FIG. 11 is an explanatory view showing an example of editing past record.
FIG. 12 is an explanatory view showing matching processing of editing past record.

Explanation will now be given in connection with the case where low resolution image having high resolution image is edited on the terminal 19. An example at the time of image editing is shown in FIG. 9. The case where image 92 within an image region of page 91 is moved to the position of image 93 and is pasted (stuck) thereat. Processing flow at the terminal 19 at this time is shown in FIG. 10. When it is detected that image editing tool starts (becomes active) (step S101), judgment is carried out whether or not such image data is image data having high resolution image (step S102). In the case where such image data is image data having high resolution image, all editing contents are preserved as past record (step S103). The editing past record is as shown in FIG. 11 in the case as shown in FIG. 9, for example. Further, when preservation or print request for editing result is made, a request for carrying out similar editing also with respect to high resolution image at high resolution image preservation location along with editing past record information (FIG. 11) is made (step S104). The output equipment which has accepted such request analyses editing past record to carry out matching in editing from low resolution image to high resolution image on the terminal 19 (FIG. 12). Thereafter, editing processing of high resolution image is carried out on the basis of the matched editing past record. With respect to matching processing at this time, in the case where, e.g., low resolution image on the terminal 19 is 300 dpi and high resolution image for printing is 600 dpi, it is sufficient to entirety double parameters indicating image positions (FIG. 12). In this example, output equipment which accepts editing request for high resolution image has editing tool similar to the terminal 19.

Figure 13:
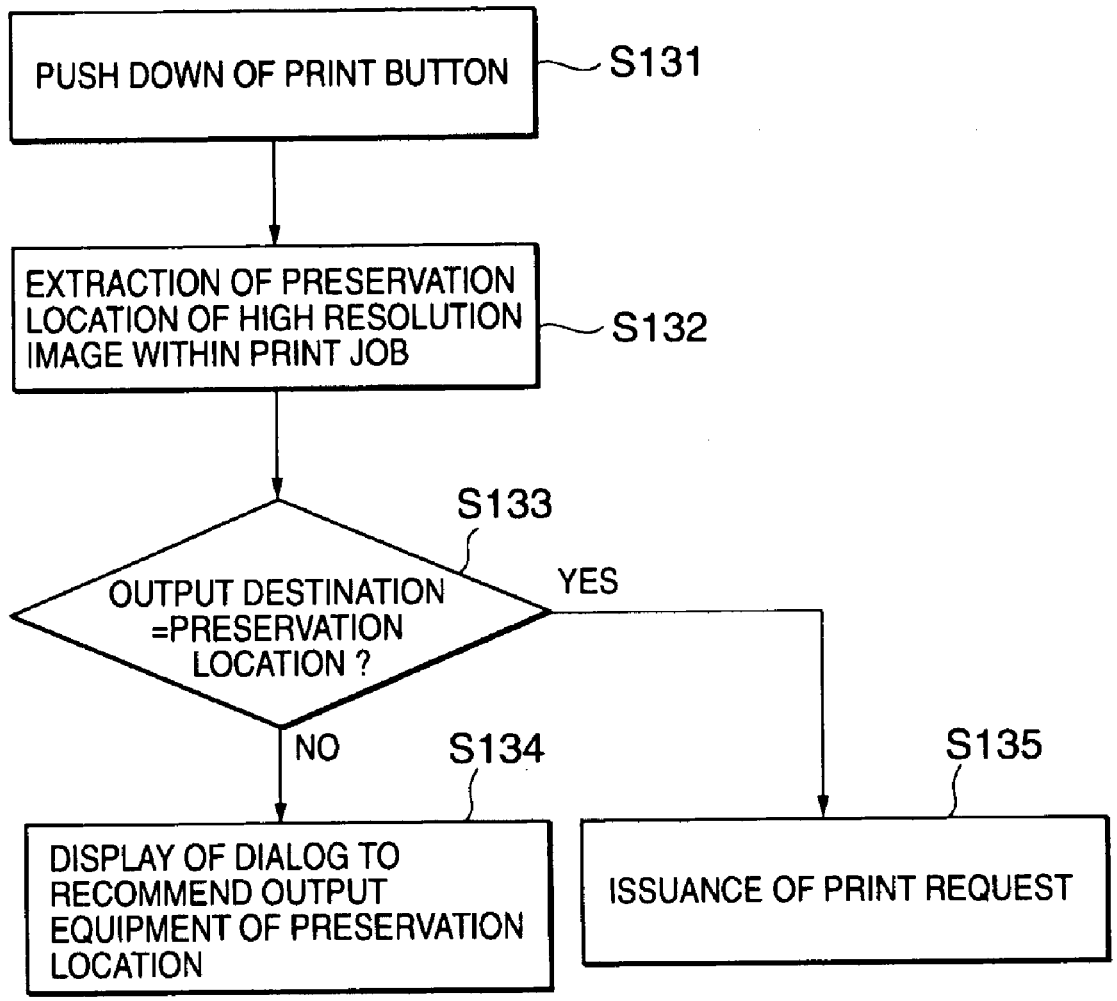
FIG. 13 is a flowchart showing processing in the case where output equipment in which no high resolution image is preserved or stored is selected.
Figure 14:
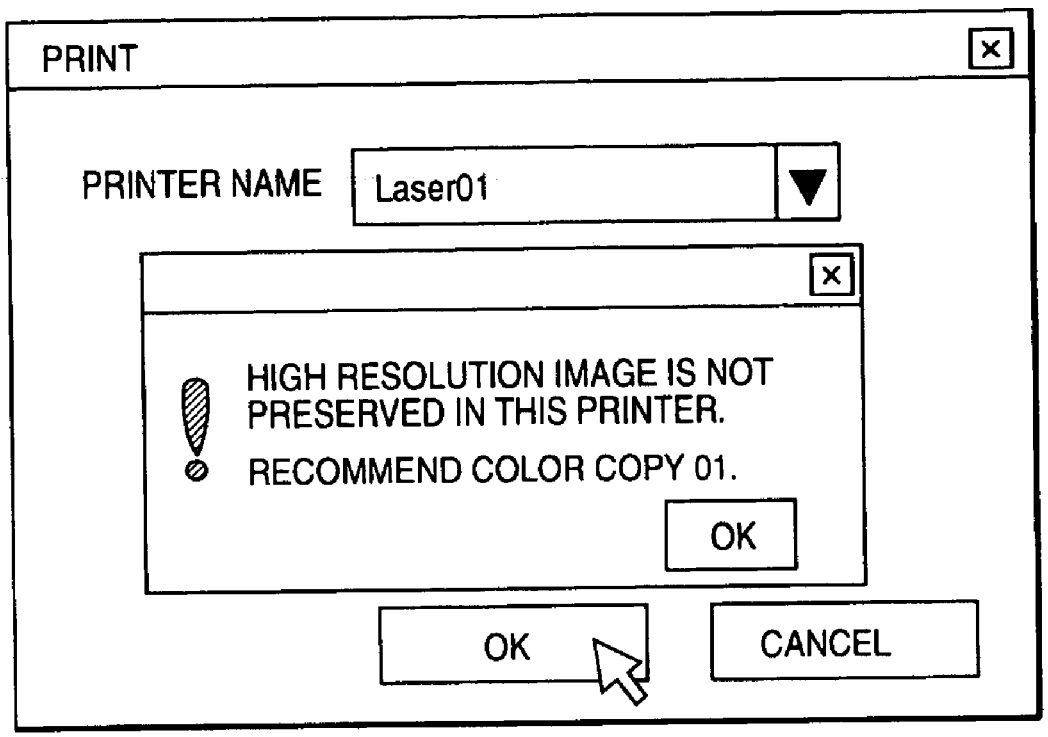
FIG. 14 is a plan view showing display on the display in the case of FIG. 13.

The case where user has selected output equipment which does not preserve high resolution image of image data in the print job at the time of printing will now be described. Processing flow at this time is shown in FIG. 13. When user makes request for print (step S131), high resolution image preservation location is extracted with respect to image data within the print job (step S132). Then, whether or not output equipment that user selects as print output destination and reservation location equipment of high resolution image are the same is examined (step S133). In the case where they are the same, print request is made with respect to user selected output equipment as scheduled. In the case where they are not the same, e.g., display as shown in FIG. 14 is carried out to notify, to user, that high resolution image is not preserved in the output equipment currently selected. In the case where the equipment in which high resolution image is preserved is the output equipment, this output equipment is recommended to user (step S134).

Figure 15:
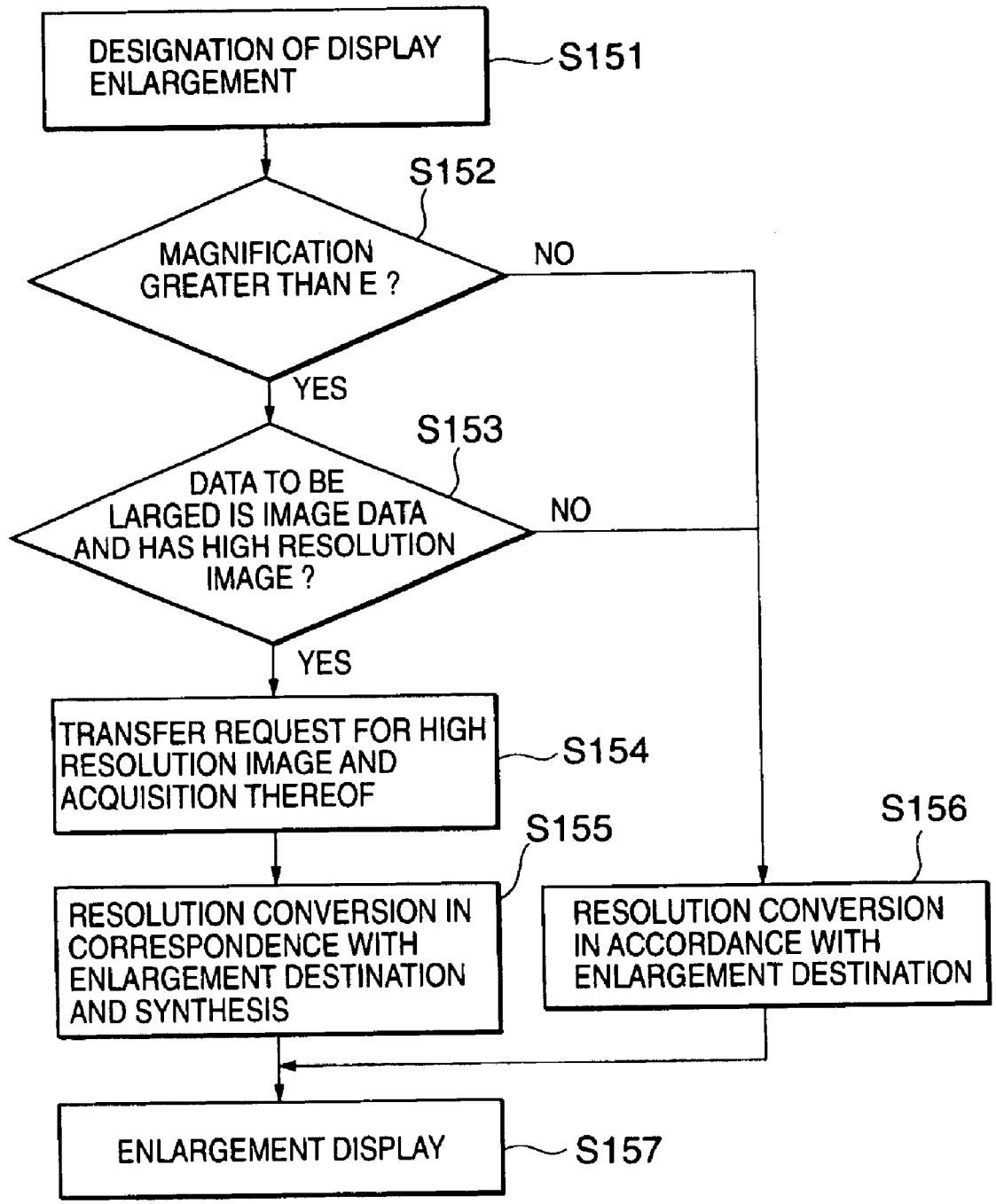
FIG. 15 is a flowchart showing processing in the case where enlargement display of preserved or stored image is carried out.

Explanation will now be given in connection with the case where enlargement display is carried out on the terminal 19. In the case where enlargement greater than a magnification determined in advance is carried out, high resolution image to be preserved is obtained to carry out display on the basis of it. Processing flow at this time is shown in FIG. 15. When enlargement designation of display is inputted (step S151), whether or not magnification factor with respect to original image is grater than magnification factor E determined in advance is judged (step S152). In the case where the former is smaller than the latter, resolution conversion is carried out in accordance with enlargement designation as ordinarily required (step S156). Thus, enlargement display is conducted (step S157). In the case where the magnification factor is greater than E, whether or not image data is included in data caused to undergo enlargement display to have high resolution image is examined (S153). In the case where such data has not high resolution image, resolution conversion is carried out in accordance with enlargement designation as ordinarily required (step S156). Thus, enlargement display is carried out (step 157). In the case where such data has high resolution image, request for transfer of high resolution image is made to preservation destination to receive and obtain such high resolution image (step S154). Then, resolution conversion and synthesis in correspondence with enlargement designation are carried out (step S155). The image data thus obtained is caused to undergo enlargement display (step S157).

Figure 16:
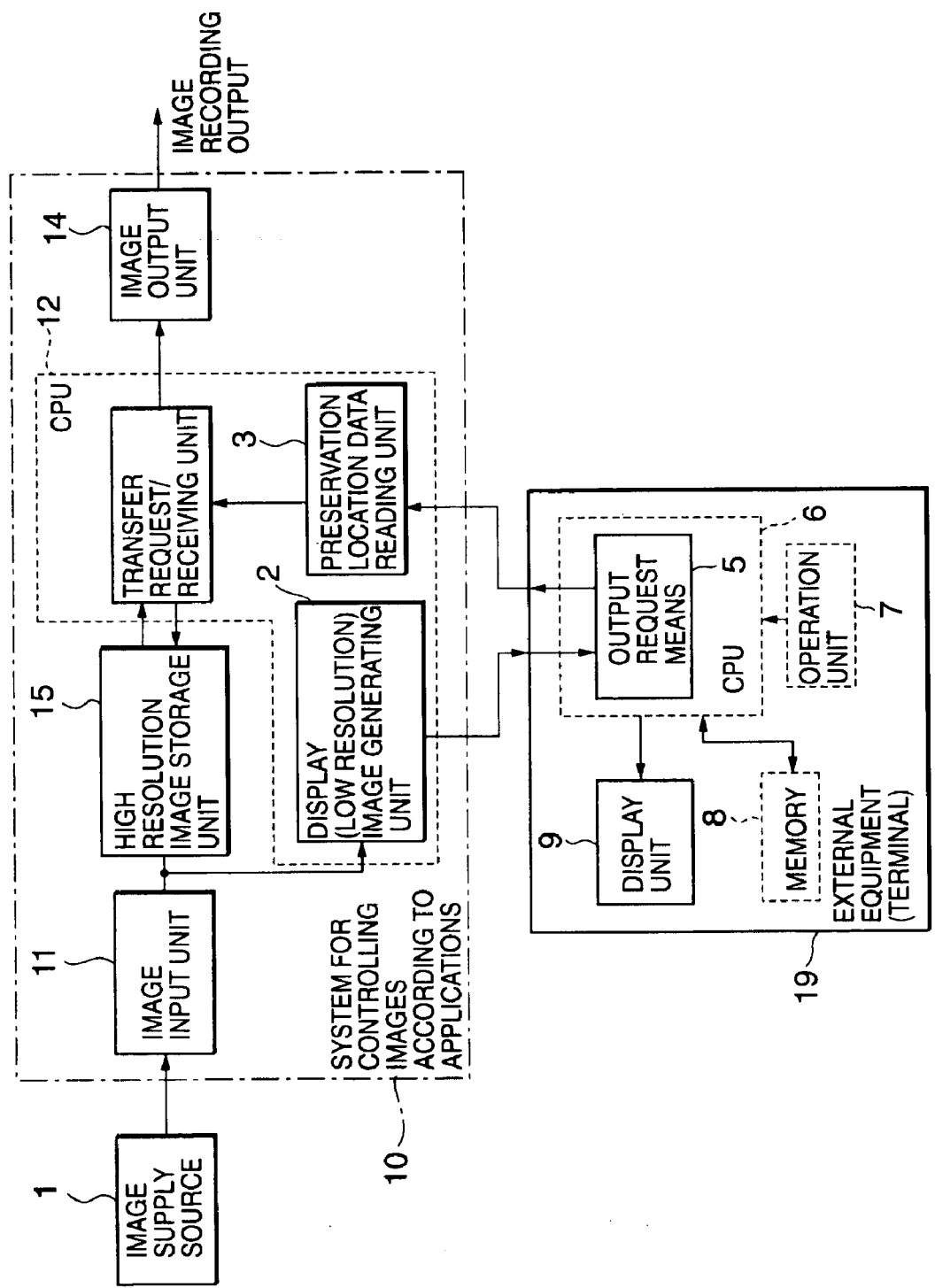
FIG. 16 is a block diagram showing basic configuration of the system for controlling images according to applicants in accordance with this invention.

The fundamental configuration of the system for controlling images according to applications in accordance with this invention is apparent from the explanation of the above-described embodiment. When this basic configuration is explained by the drawing, configuration as indicated by the block diagram shown in FIG. 16 is provided. In FIG. 16, system for controlling images according to applications 10 for carrying out print-recording of high resolution image delivered from an image supply source 1 and for supplying image to a display unit 9 of external equipment 19 comprises image input unit 11 for inputting high resolution image delivered from the image supply source 1, high resolution image storage unit 15 for storing the high resolution image inputted through the image input unit 11, a display image generating unit 2 for converting the high resolution image into low resolution image and for adding preservation location data in the storage means for the high resolution image to a portion of the display range of this low resolution image to generate display image, output request means 5 provided at the external equipment 19 and for making a request so as to carry out print output of display image displayed on the display unit, a preservation location data reading unit 3 for reading the preservation location data from the display image inputted from the output request means 5, a transfer request/receiving unit 4 for outputting image transfer request to the high resolution image storage unit 15 on the basis of preservation location data which has been read by the preservation location data reading unit and for receiving the high resolution image transferred on the basis of this request, and image output unit 14 for outputting the high resolution image received by the transfer request/receiving unit.

In the system for controlling images according to applications in accordance with the fundamental configuration, there may be employed a configuration as in the first configuration example further provided with image replacement means for replacing high resolution image received by the transfer request/receiving unit 4 by low resolution image of ich output is requested by the output request means to carry out synthesis.

The system for controlling images according to applications in accordance with the first configuration example comprises means for judging whether or not corresponding page is page having image at the time of manuscript input, storage (memory) means for preserving page having image as high resolution image for output, means for implementing resolution conversion to low resolution image for terminal as the external equipment at the time of image input, means for adding preservation location of output high resolution image to low resolution image, display image generating means for transferring (transmitting) low resolution image to which preservation location is added to terminal, external communication means for receiving transfer request and print image data from the terminal at the time of image output, reading means for reading preservation location of high resolution image added to low resolution image as received print image data, receiving means for reading, from the storage (memory) means, the original low resolution image from the preservation location which has been read to receive it, and the replacement means for replacing the high resolution image which has been read by the original low resolution image to carry out synthesis.

In the system for controlling images according to applications in accordance with the fundamental configuration, there may be employed a configuration as in the second configuration example in which such system is connected to plural external storage (memory) units which can store high resolution image, whereby when high resolution image corresponding to the print image data outputted for the purpose of request for print from the external equipment is not stored in the storage unit, request for corresponding high resolution image is made with respect to corresponding external storage unit for storing corresponding high resolution image to receive such image thereafter to output it to the image output unit.

The system for controlling images according to applications in accordance with the second configuration example comprises storage (memory) means for preserving or storing high resolution image for output, means for reading preservation location of high resolution image added to low resolution image, means for making a transfer request for high resolution image with respect to external storage unit through network that the preservation location which has been read indicates and for receiving such image, and means for replacing received high resolution image by the original low resolution image to carry out synthesis.

In the system for controlling images according to applications in accordance with the fundamental configuration, there may be employed a configuration as in the third configuration example in which there is further provided selector means connected to plural external storage (memory) units which can store high resolution image and adapted so that when image is inputted from the image supply source, it can make selection in order to preserve high resolution image by a specific external storage unit from the plural external storage units.

In the system for controlling images according to applications in accordance with the third configuration example, the selector means may select the external storage (memory) unit for preserving high resolution image for print output when image is inputted.

In the system for controlling images according to applications in accordance with the fundamental configuration, there may be employed a configuration as in the fourth configuration example in which the high resolution image storage (memory) unit stores high resolution color image and low resolution mono-chromatic image is displayed on the display unit of the external equipment as the display image.

The system for controlling images according to applications in accordance with the fourth configuration example comprises means for converting high resolution image for print output into monochromatic image when image is inputted, means for storing and controlling the converted high resolution image for monochromatic print along with color high resolution image, means for discriminating whether print page having two kinds of print data of high resolution image and low resolution image at the time of image print output is monochromatic or color, and means for reading out monochromatic or color high resolution image in accordance with the discrimination result to make replacement to carry out synthesis.

In the system for controlling images according to applications in accordance with the fundamental configuration, there may be employed a configuration as in the fifth configuration example in which there is further provided a charging unit for carrying out charging simultaneously with read-out and output of high resolution image when request for output of high resolution image is made from the external equipment.

In the system for controlling images according to applications in accordance with the fifth configuration example, the charging unit may comprise means for making replacement of high resolution image for print which has been read out and carrying out synthesis at the time of image print output, and for carrying out charging count every time print output is carried out.

In the system for controlling images according to applications in accordance with the fundamental configuration, there may be employed a configuration as in the sixth configuration example in which there are further provided a region constituting unit constituted by optimum resolutions every featured regions of page and image control (management) unit such that in the case where corresponding region is region for which high resolution image for replacement is required, it controls high resolution image every such region.

In the system for controlling images according to applications in accordance with the sixth configuration example, the image control unit may comprise means for extracting image data every featured regions within page in place of image data every page at the time of manuscript input, means for reading preservation location of high resolution image every image data within page in place of image data every page at the time of print output, and means for carrying out, every image data, replacement/synthesis of the high resolution image which has been read on the basis of the preservation location.

In the system for controlling images according to applications in accordance with the fundamental configuration, there may be employed a configuration as in the seventh configuration example in which terminal unit as the external equipment further comprises an operation unit for operating editing of image, and an image editing unit such that in the case where editing of image is operated by this operation unit, editing is implemented to high resolution image in synchronism with such an operation.

In the system for controlling images according to applications in accordance with the seventh configuration, the terminal unit for making print request to the image output unit comprises means such that in the case where image editing is implemented to low resolution image by image editing application, etc., it carries out storage/control of this editing past record, means for reading preservation location of high resolution image added to this (low resolution) image, and external communication means for issuing editing request for high resolution image with respect to external unit that the preservation location which has been read indicates to transmit this editing past record, wherein the system for controlling images according to applications may comprise means for receiving editing request for high resolution image and editing past record from the terminal unit, means for carrying out matching from low resolution to high resolution with respect to the editing past record, and means for receiving editing request to carry out editing with respect to high resolution image on the basis of editing past record in which image editing application starting matching similar to the terminal has been completed.

In the system for controlling images according to applications in accordance with the fundamental configuration, there may be employed a configuration as in the eighth configuration example in which there is further provided notification unit in which in the case where output request for high resolution image is made from the external equipment in the state where the system for controlling images according to applications in which high resolution image is not preserved is selected, it notifies, to user, that the selected system for controlling images according to applications does not preserve high resolution image and notifies which system for controlling images according to applications preserves the requested high resolution image.

In the system for controlling images according to applications in accordance with the eighth configuration, the terminal unit for making print request to the image output unit may comprise means for reading preservation location of high resolution image added to low resolution image, means for judging whether or not the unit that the preservation location which has been read indicates and the image output unit of print request destination are the same, and means for indicating this judgment result to user.

In the system for controlling images according to applications in accordance with the fundamental configuration, there may be employed a configuration as in the ninth configuration example wherein terminal unit as the external equipment comprises an enlargement display request unit for making a request for display of high resolution image when image for display is displayed on the display unit in an enlarged manner.

In the system for controlling images according to applications in accordance with the ninth configuration example, the terminal unit may comprise means for discriminating that request for enlargement display than a certain magnification factor with respect to a certain image is inputted by user, means for reading preservation location of high resolution image added (attached) to this image, external communication means for issuing transfer request for high resolution image with respect to external unit that the preservation location which has been read indicates to receive high resolution image data from the external unit, means for carrying out replacement/synthesis of received high resolution image into low resolution image, and means for displaying this image.

As described in detail, in according with this invention, such an approach is employed to control high resolution image for print by input./output equipments, etc. and to handle low resolution image to which preservation control location information of high resolution image is added at the terminal, thereby making it possible to lessen load handled of image on the terminal for display, etc. In addition, at the time of print at the input/output equipment, low resolution image is replaced by image of high resolution, thereby making it possible to obtain high quality print result.

What is claimed is:

1. A system for controlling images according to applications, which is adapted for carrying out print recording of a first resolution image delivered from an image supply source, and for delivering an image to a display unit of an external equipment, the system comprising:

an image input unit for inputting the first resolution image delivered from the image supply source;

a first resolution image storage unit for storing the first resolution image inputted through the image input unit, and also for storing preservation location data of the first resolution image together therewith;

display image generating means for converting the first resolution image into a second resolution image having lower resolution than the first resolution and for adding or attaching the preservation location data in the first resolution image storage unit to a portion of display range of the second resolution image to generate image for display;

an output request unit provided at the external equipment and for making request in order to carry out print output of the image for display displayed on the display unit;

a preservation location data reading unit for reading the preservation location data from the display image inputted from the output request unit;

a transfer request/receiving unit for outputting image transfer request to the first resolution image storage unit on the basis of the preservation location data which has been read by the preservation location data reading unit and for receiving the first resolution image transferred on the basis of the image transfer request; and an image output unit for outputting the first resolution image received by the transfer request/receiving unit.

2. A system for controlling images according to applications as set forth in claim 1, which further comprises image replacement means for replacing the first resolution image received by the transfer request/receiving unit by the second resolution image of which output is requested by the output request unit to carry out synthesis thereof.

3. A system for controlling images according to applications as set forth in claim 2, the system comprising:

means for judging whether or not corresponding page is page having image at the time of manuscript input;

storage means for preserving or storing the page having image as a first resolution image for output;

means for implementing resolution conversion to a second resolution image for terminal as the external equipment at the time of image input;

means for adding or attaching preservation location of the output first resolution image to the second resolution image;

display image generating means for transferring/transmitting the second resolution image to which preservation location is attached to terminal;

external communication means for receiving transfer request and print image data from the terminal at the time of image output;

reading means for reading preservation location of the first resolution image added or attached to the second resolution image as the received print image data;

receiving means for reading, from the storage means, original second resolution image from the preservation location which has been read; and the replacement means for replacing the first resolution image which has been read by the original second resolution image to carry out synthesis thereof.

4. A system for controlling images according to applications as set forth in claim 1, wherein the system for controlling images according to applications is connected to plural external storage units which can store the first resolution image, whereby when the first resolution image corresponding to the print image data which has been outputted for print request from the external equipment is not stored in the storage unit, a request for corresponding first resolution image is made with respect to external storage unit for storing the corresponding first resolution image to receive such image thereafter to output it to the image output unit.

5. A system for controlling images according to applications as set forth in claim 4, the system comprising:

storage means for preserving or storing the first resolution image for output;

means for reading preservation location of the first resolution image added or attached to the second resolution image;

means for carrying out transfer request for the first resolution image and reception of image with respect to external storage unit through network that the preservation location which has read indicates and for receiving such image; and means for replacing the received first resolution image by original second resolution image to carry out synthesis thereof.

6. A system for controlling images according to applications as set forth in claim 1, which further comprises selector means connected to plural external storage units which can store the first resolution images and such that when an image is inputted from the image supply source, it can select the first resolution image in order to preserve such first resolution image into a specific external storage unit from the plural external storage units.

7. A system for controlling images according to applications as set forth in claim 6, wherein the selector means serves to select the external storage unit for preserving the first resolution image for print output when image is inputted.

8. A system for controlling images according to applications as set forth in claim 1, wherein the first resolution image storage unit stores the first resolution color image, and the second resolution monochromatic image is displayed on the display unit of the external equipment as the display image.

9. A system for controlling images according to applications as set forth in claim 8, the system comprising:

means for carrying out monochromatic conversion of the first resolution image for print output when image is inputted;

means for carrying out storage/control of the converted first resolution image for monochromatic print along with color first resolution image;

means for discriminating whether print page having two kinds of print data of the first resolution image and the second resolution image is monochromatic or color at the time of image print output; and means for reading out monochromatic or color first resolution image in accordance with the discrimination result to carry out replacement/synthesis thereof.

10. A system for controlling images according to applications as set forth in claim 1, which further comprises a charging unit for carrying out charging simultaneously with read-out and output of the first resolution image when request for output of the first resolution image is made from the external equipment.

11. A system for controlling images according to applications as set forth in claim 10, wherein the charging unit comprises means for carrying out replacement and synthesis of the first resolution image for print which has been read out at the time of image print to carry out print output thereof.

12. A system for controlling images according to applications as set forth in claim 1, which further comprises a region constituting unit constituted by optimum resolutions every featured region of page, and an image control unit such that when the region constituted by this region constituting unit is the region for which region where the first resolution image for replacement is required, it controls the first resolution image every region.

13. A system for controlling images according to applications as set forth in claim 12, wherein the image control unit comprises:

means for extracting image data every featured region within page in place of image data every page at the time of manuscript input;

means for reading preservation location of the first resolution image every image data within page in place of image data every page at the time of print output; and means for carrying out, every image data, replacement/synthesis of the first resolution image which has been read on the basis of the preservation location.

14. A system for controlling images according to applications as set forth in claim 1, wherein a terminal unit as the external equipment further comprises an operation unit for operating editing of image and an image editing unit such that in the case where editing of image is operated by this operation unit, it implements editing to the first resolution image in synchronism with the operation.

15. A system for controlling images according to applications as set forth in claim 14, wherein the terminal unit for making print request to the image output unit comprises:

means such that in the case where image editing is implemented to a second resolution image by image editing application, it carries out storage/control of this editing past record;

means for reading preservation location of the first resolution image added or attached to the second resolution image; and external communication means for issuing editing request for the first resolution image with respect to the external unit that the preservation location which has been read indicates to transmit its editing past record thereof, and wherein the system for controlling images according to applications comprises:

means for receiving editing request for the first resolution image and editing past record from the terminal unit;

means for implementing matching processing from the second resolution to the first resolution with respect to editing past record; and means for starting image editing application similar to the terminal on the basis of the editing request and for carrying out editing with respect to the first resolution image on the basis of editing past record to which matching processing has been carried out.

16. A system for controlling images according to applications as set forth in claim 1, further comprising a notification unit such that in the case where output request for the first resolution image is made from the external equipment in the state where there is selected the system for controlling images according to applications in which the first resolution image is not preserved, it notifies, to user, that the selected system for controlling images according to applications does not preserve the first resolution image and notifies which system for controlling images according to applications preserves requested first resolution image.

17. A system for controlling images according to applications as set forth in claim 16, wherein a terminal unit which makes print request to the image output unit comprises:

means for reading preservation location of the first resolution image added or attached to the second resolution image, means for judging whether or not unit that the preservation location which has been read indicates and image output unit of print request destination are the same; and means for indicating this judgment result to user.

18. A system for controlling images according to applications as set forth in claim 1, wherein a terminal unit as the external equipment comprises an enlargement display request unit for making a request for display of the first resolution image when image for display is displayed on the display unit in an enlargement manner.

19. A system for controlling images according to applications as set forth in claim 18, wherein the terminal unit comprises:

means for discriminating that request for enlargement display more than a certain magnification is inputted by user with request to an image;

means for reading preservation location of the first resolution image added or attached to the above-mentioned image;

external communication means for issuing transfer request for the first resolution image with respect to external unit that the preservation location which has been read indicates to receive the first resolution image data from the external unit;

means for replacing the received first resolution image by the second resolution image to carry out synthesis thereof; and means for displaying this image.

20. A method for controlling images according to applications which is adapted for printing images having a first resolution from an image supply source and for delivering images to a display unit of an external equipment, the method comprising:

inputting a first resolution image delivered from the image supply source;

storing, at a first resolution image storage unit, the first resolution image together therewith with preservation location data of the first resolution image;

generating a display by converting the first resolution image into a second resolution image having lower resolution and adding or attaching the preservation location data to a portion of the second resolution image to generate image for display;

requesting, at the external equipment, to carry out printing of the image generated for display;

reading the preservation location data from the image generated for display;

outputting a request to the first resolution image storage unit, on the basis of the read preservation location data, for the first resolution image; and outputting the first resolution image received in response to the request to the first resolution image storage unit.

* * * * *